(12) United States Patent
Van Aert et al.

(10) Patent No.: US 12,497,481 B2
(45) Date of Patent: Dec. 16, 2025

(54) AQUEOUS CATIONIC POLYURETHANE DISPERSIONS

(71) Applicant: AGFA NV, Mortsel (BE)

(72) Inventors: Hubertus Van Aert, Mortsel (BE); Johan Loccufier, Mortsel (BE); Marie Lehericey, Mortsel (BE); Mei-Yuan Hsu, Mortsel (BE)

(73) Assignee: Agfa NV, Mortsel (BE)

( * ) Notice: Subject to any disclaimer, the term of this patent is extended or adjusted under 35 U.S.C. 154(b) by 881 days.

(21) Appl. No.: 17/628,986

(22) PCT Filed: Jun. 30, 2020

(86) PCT No.: PCT/EP2020/068342
§ 371 (c)(1),
(2) Date: Jan. 21, 2022

(87) PCT Pub. No.: WO2021/013481
PCT Pub. Date: Jan. 28, 2021

(65) Prior Publication Data
US 2022/0259366 A1 Aug. 18, 2022

(30) Foreign Application Priority Data
Jul. 25, 2019 (EP) .................................. 19188364

(51) Int. Cl.
*C08G 18/28* (2006.01)
*C08G 18/12* (2006.01)
*C08G 18/32* (2006.01)
*C08G 18/40* (2006.01)
*C08G 18/42* (2006.01)
*C08G 18/48* (2006.01)
*C08G 18/75* (2006.01)
*C09D 11/102* (2014.01)
*C09D 11/322* (2014.01)
*C09D 11/326* (2014.01)
*C09D 11/38* (2014.01)
*C09D 11/40* (2014.01)
*C09D 11/54* (2014.01)

(52) U.S. Cl.
CPC ......... *C08G 18/2865* (2013.01); *C08G 18/12* (2013.01); *C08G 18/3206* (2013.01); *C08G 18/4018* (2013.01); *C08G 18/4213* (2013.01); *C08G 18/4833* (2013.01); *C08G 18/755* (2013.01); *C09D 11/102* (2013.01); *C09D 11/322* (2013.01); *C09D 11/326* (2013.01); *C09D 11/38* (2013.01); *C09D 11/40* (2013.01); *C09D 11/54* (2013.01)

(58) Field of Classification Search
CPC .......................... C08G 18/2865; C08G 18/12; C08G 18/4018; C08G 18/4213; C08G 18/4833; C08G 18/755; C08G 18/3206; C09D 11/102; C09D 11/322; C09D 11/326; C09D 11/38; C09D 11/40; C09D 11/54
See application file for complete search history.

(56) References Cited

U.S. PATENT DOCUMENTS

| | | | |
|---|---|---|---|
| 3,686,108 A | 8/1972 | Reiff et al. | |
| 7,964,665 B2 | 6/2011 | Nagao et al. | |
| 10,982,035 B2 * | 4/2021 | Van Aert | C08G 18/4213 |
| 11,572,482 B2 * | 2/2023 | Loccufier | C09D 11/38 |
| 11,708,505 B2 * | 7/2023 | Van Aert | C08K 3/013 |
| | | | 525/25 |
| 11,802,205 B2 * | 10/2023 | Van Aert | C09D 11/54 |
| 2009/0233065 A1 | 9/2009 | Komatsu | |
| 2012/0308828 A1 * | 12/2012 | Iwazumi | C08G 18/44 |
| | | | 428/423.1 |
| 2013/0116361 A1 * | 5/2013 | Malotky | C08J 3/05 |
| | | | 524/588 |

FOREIGN PATENT DOCUMENTS

| | | | | |
|---|---|---|---|---|
| EP | 2419467 A1 * | 2/2012 | ......... | C08G 18/0823 |
| JP | 2009-237174 A | 10/2009 | | |
| WO | WO-2019105786 A1 * | 6/2019 | ......... | B41M 5/0011 |
| WO | WO-2019105867 A1 * | 6/2019 | ............ | B41J 2/2107 |
| WO | WO-2019105904 A1 * | 6/2019 | ......... | C08G 18/0814 |

OTHER PUBLICATIONS

European Patent Office, International Search Report in International Patent Application No. PCT/EP2020/068342, mailed Oct. 7, 2020, 3 pp.
European Patent Office, Written Opinion in International Patent Application No. PCT/EP2020/068342, mailed Oct. 7, 2020, 7 pp.
Fock et al., "Polyether-1,2- and -1,3-diols as macromonomers for the synthesis of graft copolymers, 1. Synthesis and characterization of the macromonomers," *Makromol. Chem.*, 191: 3045-3057 (1990).

* cited by examiner

*Primary Examiner* — Rabon A Sergent
(74) *Attorney, Agent, or Firm* — Leydig, Voit & Mayer, Ltd.

(57) ABSTRACT

An aqueous polyurethane resin dispersion, the polyurethane resin having a polyalkylene oxide in a side chain thereof and is obtainable by reacting in an organic solvent, a polyisocyanate with a 1,2 or 1,3 polyether diol and with a polymeric diol selected from the group consisting of polyester diol, polyether diol, polycarbonate diol, polyacrylate diol and polyolefin diol and by adding a cationic surfactant or cationic surfactant precursor to the organic solvent.

16 Claims, No Drawings

AQUEOUS CATIONIC POLYURETHANE DISPERSIONS

CROSS-REFERENCE TO RELATED APPLICATIONS

This patent application is the U.S. national phase of copending International Patent Application No. PCT/EP2020/068342, filed Jun. 30, 2020, which claims the benefit of European Patent Application No. 19188364.4, filed Jul. 25, 2019.

TECHNICAL FIELD

The present invention relates to an aqueous polyurethane resin dispersion and more specifically to the use of the polyurethane resin in treatment liquids of substrates for ink jet printing with aqueous ink jet inks or in aqueous ink jet inks.

BACKGROUND

In ink jet printing it happens that the substrate (e.g. paper or a textile fabric) is treated with an aqueous cationic polymeric dispersion to fix the colorants of the inks applied subsequently onto the substrate. Among many aqueous cationic polymeric dispersions, polyurethane based resin dispersions are preferred because one of the properties of polyurethane based resins is that they assure a good adhesion of the resin to non-porous substrates as disclosed in US2009/0233065.

Aqueous cationic polyurethane dispersions are usually produced by incorporating tertiary amino diols or polyols in the polyurethane chain and which can be quaternized by protonation or reaction with an alkyl halide.

Quaternized amino diols have the disadvantage that the solubility in typical solvents used for the polyurethane synthesis such as acetone, acetonitrile or dioxolane is poor which requires the use of solvents having a high boiling point such as NMP, DMF, DMA, NEP, DMSO, sulfolane, TOU, Dipropylene glycol dimethyl ether. The presence of these solvents make it very hard to obtain aqueous cationic polyurethane dispersions free of solvents as they cannot be easily removed by distillation.

Furthermore, quaternized amino diols are only commercially available in limited cases. And the one which are commercially available are not listed on the Swiss list, i.e. not compliant with Annex 10 of the Ordinance of the FDHA on articles and materials SR817.023.21 dated May 2017. When using cationic polyurethane resins for materials such as inks and primers which come into contact with food and drinks, the compliance with this list is important.

JP2009237174 discloses polymers made from quaternized amino diols, the polymers are prepared and used in organic solvents.

In WO2019/105786 aqueous dispersions of a polyurethane resin having a quaternary N-atom or tertiary amino group are described.

Another possibility to obtain aqueous cationic polyurethane dispersions which cationic character, is to quaternize the amino groups after the polyurethane synthesis has been performed as disclosed in U.S. Pat. Nos. 3,686,108 and 7,964,665B2. This quaternization has to be done with reagents such as methyl sulphate or benzyl chloride which are toxic and due to the fact that the quaternisation is incomplete, have to be removed from the aqueous dispersion, especially if these resins are used in contact with food and drinks.

From the above, it is clear that a synthesis method is required for aqueous polyurethane resin dispersions, the raw materials for the preparation being readily available, compliant with the Swiss list, and which does not require the use of organic solvents having a high boiling point or a purification process.

SUMMARY OF INVENTION

It is an objective of the invention to provide a solution for the above stated problems. The objective has been achieved by adding cationic surfactants to the organic solvent in which the polyurethane resin dispersion is prepared as defined in claim 1

According to another aspect, the present invention includes a treatment liquid for inkjet recording, the treatment liquid includes the aqueous dispersion as defined in claim 1. The treatment liquid is defined in claim 6.

According to another aspect, the present invention includes an aqueous inkjet ink including the aqueous dispersion as defined in claim 1. The inkjet ink is defined in claim 11.

According to another aspect, the present invention includes an inkjet recording method using the aqueous dispersion as defined in claim 1. This method is defined in claim 14.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Aqueous Polyurethane Resin Dispersion

A.1. Polyurethane Resin

The polyurethane resin of the aqueous dispersion according to the invention is characterised by the fact that the polyurethane resin comprises a polyalkylene oxide in a side chain of the polyurethane backbone. The polyurethane resin of the invention is obtainable by reacting a polyether diol, and a polymeric diol selected from the group consisting of polyester diol, poly ether diol, polycarbonate diol, polyacrylate diol and polyolefin diol with a polyisocyanate in an organic solvent. Preferable solvents are acetone, acetonitrile and MEK, since these can be removed after the dispersion step. A cationic surfactant is added to the organic solvent. The cationic surfactant may be added before the reaction takes place, during the reaction or after the reaction. The cationic surfactant may be added as a solution or can be directly added to the organic solvent. In another embodiment, the cationic surfactant can be added together with the water which is added to the polyurethane resin solution to obtain an aqueous cationic polyurethane resin dispersion. The first water which is added does not cause the polyurethane polymer to become insoluble. But after addition of more water the polyurethane dispersion will be formed due to the insolubility of the polyurethane polymer in water. In order to get a good interaction or incorporation of the surfactant with the dispersion particles, the surfactant is preferably added in the first fraction of water added. The first fraction of water added preferably contains the quaternary surfactant, while the second fraction contains no quaternary surfactant and only water. Preferably the first fraction is 10-30% of the total water amount added.

If the cationic surfactant comprises reactive groups toward isocyanate, then it is preferable to add the surfactant at the time the reacting between polyisocyanate, polyether diol and the polymeric diol is completed. The reacting is to be considered completed when no further reaction product (polyurethane resin) is formed.

Both the cationic surfactant, incorporated in the polyurethane dispersion and the polyalkylene oxide increase the dispersibility and colloidal stability of the dispersed resin in water.

Without being bound by a theory, it is assumed that the cationic surfactant is incorporated in the aqueous polyurethane resin dispersion without being covalently bonded to the polyurethane resin. The obtained flexibility of the stabilising groups coming from the cationic surfactant increase the colloidal stability with respect to a cationic surfactant which is covalently incorporated in the resin.

A.1.1. Polyether Diol

The polyether dio is preferably a 1,2 or 1,3 polyether diol. 1,2- and 1,3-polyether diols can be synthesized by alkoxylation of cyclic hydroxy-functional ketals derived from alcohols with at least three hydroxy groups. Afterwards the ketal can be converted into the diol under acidic conditions.

Examples of useful ketals are: 5-ethyl-2,2-dimethyl-1,3-dioxane-5-methanol, CAS Registry Number 20761-68-6, 2,2-dimethyl-1,3-dioxane-5-methanol, CAS Registry Number 4728-12-5, 2,2,5-trimethyl-1,3-dioxane-5-methanol, CAS Registry Number 3663-46-5, 2,2-dimethyl-1,3-dioxane-5,5-dimethanol, CAS Registry Number 770-74-1, 2,2-dimethyl-1,3-dioxolane-4-methanol, CAS Registry Number 100-79-8.

Alternatively, to the use hydroxyl functional ketals, one can use also oxetanes, but these are less stable upon alkoxylation, examples are e.g. 3-methyl-3-oxetanemethanol, CAS Registry Number 3143-02-0 or 3-ethyl-3-oxetanemethanol=trimethylolpropane oxetane, CAS Registry Number 3047-32-3

Preferred polyether diols are compounds according to Formula 1.

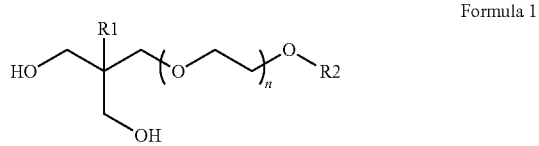

Formula 1 wherein R1 is methyl or ethyl, R2 is H or $C_1$-$C_4$ alkyl and n represents an integer from 5 to 50, more preferably from 10 to 40 and most preferably from 15 to 30.

The polyether diol which can be preferably used in the present invention, is Ymer N120 or Tegomer D 3403, i.e. α-[2,2-bis(hydroxymethyl)butyl]-ω-methoxy-Poly(oxy-1,2-ethanediyl). These diols can be prepared from 5-ethyl-2,2-dimethyl-1,3-dioxane-5-methanol, CAS Registry Number 20761-68-6 or 3-ethyl-3-oxetanemethanol=trimethylolpropane oxetane, CAS Registry Number 3047-32-3.

A possible synthesis procedure is described by Fock, J.; Möhring, V., Polyether-1,2- and -1,3-diols as macromonomers for the synthesis of graft copolymers, 1. Synthesis and characterization of the macromonomers. Die Makromolekulare Chemie 1990, 191 (12), 3045-3057.

Ymer N120 or Tegomer D 3403 are known under CAS registry number 131483-27-7, ie. α-[2,2-bis(hydroxymethyl)butyl]-ω-methoxy-poly(oxy-1,2-ethanediyl).

In general, also other polyether 1,2- or 1,3-diols can be used. For a good stability the polyether graft needs to be well water soluble in order to give a good steric stabilisation. In the case of Ymer N120 the polyether is only composed of ethylene oxide segments, but this can also be a copolymer of different alkylene oxides. Furthermore, in the current macromonomer diol the end group is a methoxy group, this end group can also be other end groups such as a hydrophilic end group (such as anionic groups, e.g. carboxylic, sulphate, phosphate, etc. or cationic groups, e.g. quaternary amine groups or precursors for cationic groups e.g. tertiary amino groups) in order to have also electro-steric stabilisation.

The content of the polyether diol in the polyurethane resin is preferably 30 wt. % or less, but more than 1 wt. % with respect to the total solid weight of the polyurethane resin, more preferably the polyether diol content is equal to or less than 15 wt. % and more than 2 wt. % with respect to the polyurethane resin. A content of the polyether diol of less than 30 wt. %, but more than 1 wt. % with respect to the polyurethane resin, has an additional improvement in scratch resistance and solvent resistance of the jetted and dried image with respect to polyether diol content outside this range. Too high polyether diol content (more than 30 wt%) would lead to a too high water solubility and lower glass transition temperature.

A.1.2. Polymeric Diols

Preferred polymeric diols include polycarbonate diols, polyether diols, polyacrylate diols, aliphatic polyester diols, polyolefin diols. More preferred diols are polyester diol, obtained by reacting a polycarboxylic acid and a polyol.

Most preferably, the polyester diol is a resin formed by an esterification reaction or transesterification reaction between at least one aromatic polycarboxylic acid component and at least one polyol component. Specific examples of the aromatic polycarboxylic acid include dibasic acids such as phthalic acid, isophthalic acid, terephthalic acid, 2,6-Naphthalenedicarboxylic acid, 1,4-naphthalenedicarboxylic acid, 1,5-naphthalenedicarboxylic acid; tri- or higher -valent polybasic acids such as trimellitic acid and pyromellitic acid; and acid anhydrides thereof, for example, phthalic anhydride, trimellitic anhydride, pyromellitic anhydride; and the like. As the aromatic polycarboxylic acid component, one or more dibasic acids selected from the dibasic acids mentioned above, lower alkyl ester compounds of these acids, and acid anhydrides are mainly used. If necessary, a monobasic acid such as benzoic acid, crotonic acid or p-t-butyl benzoic acid; a tri- or higher valent polycarboxylic acid such as trimellitic anhydride, methylcyclohexene tricarboxylic acid or pyromellitic anhydride; or the like can be further used in combination with the polycarboxylic acid component. It is preferred that the polyester is prepared using dicarboxylic acids which give linear polymer chains, in particular 1,4-terephtalic acid copolymers give a better performance regarding colloidal stability in aqueous medium, than phthalic acid anhydride copolymers. Besides terephthalic acids, one could use also other para- or linear substituted polycarboxylic acids to obtain the desired properties such as 2,6-naphthalenedicarboxylic acid or 1,5-naphthalenedicarboxylic acid.

The preferred carboxylic acid is an aromatic dicarboxylic acid such as terephthalic acid and isophthalic acid. The content of aromatic acids within the resin is equal to or higher than 30 mol % and preferably equal to or higher than 50 mol % with respect to the total amount of dicarboxylic acids or anhydrides. Treatment liquids comprising polyurethane resins obtained by reaction of polyesters diols containing aromatic polycarboxylic acids do show an improved colloidal stability and lead to images with an improved solvent resistance and an improved dry and wet scratch resistance. The good results obtained with terephthalic acids and isophthalic acids has probably to do with obtaining a certain amount of crystallinity of the polyurethane resin or providing linear amorphous chains which contribute more to the desired physical properties such as scratch resistance and solvent resistance. Introducing phthalic acid anhydride or isophthalic acid in terephthalic acid based polyesters reduces the crystallinity or chain end-to-end distance and improves the solubility in organic solvents. For terephthalic acid based polyester diols, it is preferred to use copolymers of terephthalic acid with isophthalic acid, more preferably having at least 20 mol % isophthalic acid. For the same reason polyester diols with only phthalic acid anhydride are less preferred than copolymers where terephthalic acid is incorporated. Polyester diols based on only phtalic acid anhydride could be very soluble in the polymerization solvent for the preparation, but a dried coating will have also a lower solvent resistance. Therefore, it is preferred that the aromatic polyester diol contains between 20 and 80 mol % of terephthalate groups on the basis of the total amount of dicarboxylic acids (or acid anhydrides) in the polyester diol.

Very suitable polyester diols containing terephthalic ester units and isophthalic ester units in a ratio of 1:1 mol % are: Dynacoll 7150 supplied by Evonik, Marl, Germany, Vylon 220 from Toyobo, Osaka Japan and Elitel 1401 obtained from Unitika Ltd Dusseldorf Germany.

In order to obtain the desired properties of the polyester diol and using a high content of terephthalic acid, one could use also a mixture of dicarboxylic acids. For example, to reduce the crystallinity one could use a mixture of terephthalic acid and adipic acid. Consequently, one could use also polyester diols based on a mixture of aromatic polycarboxylic acids and aliphatic dicarboxylic acids such as adipic acid, succinic acid, methylcyclohexene tricarboxylic acid, fumaric acid and sebacic acid or anhydrides such as tetrahydrophthalic acid anhydride, hexahydrophtalic acid anhydride, maleic acid anhydride and succinic acid anhydride.

Polyester diols with a high content of terephthalic acid could have a poor solubility in the preparation solvent (e.g. acetone) for the preparation or could have a too high degree of crystallinity in order to get good adhesive properties. In particular, this is the case when only non-branched diols are used for the polyester diol, such as 1,2-ethylene glycol or 1,4-butane diol. When using terephthalic acid based polyester diols with more than 35 mol % terephthalic acid, one can preferably use a mixture of different non-branched diols (e.g. a mixture of 1,2-ethylene glycol and 1,4-butane diol) or a mixture of a non-branched diol (e.g. ethylene glycol) with a branched diol (e.g. neopentyl glycol). When using mixtures of different diols for the polyester diol, one could use high terephthalic acid contents, even up to 100 mol % based of the total dicarboxylic acid content.

Specific examples of the diol component include diols such as ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanediol; and tri- or higher-valent polyols such as glycerin, trimethylolethane, trimethylolpropane and pentaerythritol. For the diol component, diols as mentioned above are mainly used, and if necessary, tri- or higher-valent polyols such as glycerin, trimethylolethane, trimethylolpropane and pentaerythritol can be further used in combination with the diols. Aliphatic diols comprising aromatic units can also be used to increase the content of aromatic moieties in the polyester diol. Suitable diols are: p-xylene glycol, 1,5-naphthalenedimethanol, 1,4-naphthalenedimethanol, 4,4'-bis(hydroxymethyl)biphenyl, bis(hydroxyethyl) terephthalate, bis(2-hydroxypropyl) terephthalate, 1,5-naphthalenedicarboxylic acid 1,5-bis(2-hydroxyethyl) ester, 4,4-bis(hydroxymethyl) diphenylmethane, 2,2-bis(4-β-hydroxyethoxyphenyl)propane (diethoxylated bisphenol A) and bis[p-(2-hydroxyethoxy)phenyl]methane.

Preferably diols with a Mw equal to or less than 400 are used together with the polyester diol. These diols can be used singly or as mixture of two or more kinds.

Besides the polyester diols, other different polymeric diols can be used for example to adjust the physical properties, adhesion, mechanical performance, etc. Examples are e.g. polycarbonate diols, polyether diols, polyacrylate diols, aliphatic polyester diols, polyolefin diols or other polymeric diols. Examples of polycarbonate diols are e.g. Oxymer C112, Oxymer M112 (available via Perstorp), Kuraray diol C-2050, C-2090, C-1090 (available from Kuraray), Converge HMA-1 and Converge HMA-1 (available from Novomer Inc.), Duranol T6002, T6001, T5652, T5651, T5650J, T4672, T4671, T4692 and T4691 (available from Asahi kasei). Additional aliphatic polyester diols, are e.g. regular (semi)crystalline or amorphous grades, e.g. based on hexane diol adipates (e.g. Dynacoll 7372 from Evonik) but also polyester diols based on natural products such as polyester diols made by using dimer acid or dimer diols (e.g. trade name Priplast from Croda), examples are Priplast 3192 and Priplast 1838. The raw material used to prepare certain Priplast grades, i.e. dimer diols with trade name Pripol can also be used as monomer in the synthesis to modify the physical properties and adhesive properties.

A.1.3. Polyisocyanates

Specific examples of the organic polyisocyanate compound that is reacted with the polyester diol include aliphatic diisocyanates such as lysine diisocyanate, hexamethylene diisocyanate, 1,5-pentamethylene diisocyanate and trimethylhexane diisocyanate; cyclic aliphatic diisocyanates such as hydrogenated xylene diisocyanate, isophorone diisocyanate, methylcyclohexane-2,4 (or 2,6)-diisocyanate, 4,4'-methylenebis(cyclohexyl isocyanate) and 1,3-(isocyanatomethyl) cyclohexane; aromatic diisocyanates such as tolylene diisocyanate, xylene diisocyanate and diphenylmethane diisocyanate; organic polyisocyanates themselves, including tri- or higher-valent polyisocyanates such as lysine triisocyanate; adducts each composed of such an organic polyisocyanate with a polyhydric alcohol, a low molecular weight polyester resin; and cyclised polymers (for example, isocyanurate), biuret type adducts and the like, each formed from various diisocyanate compounds mentioned above.

It is preferable, from the viewpoint of storage stability of the treatment liquid composition, that the organic polyisocyanate compound according to the invention include at least one selected from non-yellowing type polyisocyanate compounds such as isophorone diisocyanate, hexamethylene diisocyanate and lysine diisocyanate, and it is more preferable that the organic polyisocyanate compound include at least isophorone diisocyanate.

Furthermore, the organic polyisocyanate compounds can be used singly alone or as mixtures of two or more kinds.

A.1.4. Cationic Surfactants

The cationic surfactants, useful in the invention, are preferably soluble or dispensable in water but also in an organic solvent, more preferably in a solvent which is used for the polymerisation reaction. The surfactant could be a typical cationic surfactant having one or two alkyl or alkyl aryl substituents which are substantionally longer than other alkyl groups substituted on the quaternary amine group. Besides quaternary amonium surfactants also quaternary phosphonium, sulphonium or iodinium compounds could be used.

Suitable cationic surfactants to be used according to the invention are listed in Table 1.

TABLE 1

| Structure | Nr |
|---|---|
| [S-1 structure] | S-1 |
| [S-2 structure] | S-2 |
| [S-3 structure] | S-3 |
| [S-4 structure] | S-4 |
| [S-5 structure] | S-5 |
| [S-6 structure] | S-6 |
| [S-7 structure] | S-7 |

TABLE 1-continued

| Structure | Nr |
|---|---|
| [S-8 structure] | S-8 |
| [S-9 structure] | S-9 |
| [S-10 structure] | S-10 |
| [S-11 structure] | S-11 |
| [S-12 structure] | S-12 |
| [S-13 structure] | S-13 |
| [S-14 structure] | S-14 |

Preferably the cationic surfactants comprise an ammonium group, more preferably, the cationic surfactants are according Formula II

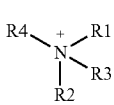

Formula II wherein
R1 is a hydrogen or a substituted or unsubstituted alkyl group having 1 to 4 carbon atoms R2 and R3 are independently a substituted or unsubstituted alkyl group having between 1 carbon atom and 18 carbon atoms or a benzyl group R4 is a substituted or unsubstituted alkyl group having at least 8 carbon atoms.

One of the advantages of obtaining cationic polyurethane dispersions according to the invention, is that a lot of the cationic surfactants are compliant with the Swiss list and hence lead to dispersions which can be used in inks for printing on food and drugs packaging. In particular, following cationic surfactants, compliant with the Swiss list, listed in Table 2 can be used:

TABLE 2

| Structure | Nr |
|---|---|
| $CH_3-N^+(CH_3)(CH_3)-(CH_2)_{15}CH_3$ •Cl- | SP-1 |
| $CH_3-N^+(CH_3)(CH_3)-(CH_2)_{15}CH_3$ •Br- | SP-2 |
| $CH_3-N^+(CH_3)(CH_3)-(CH_2)_{13}CH_3$ •Br- | SP-3 |
| Benzyl-N$^+$(CH$_3$)(CH$_3$)-(CH$_2$)$_{13}$CH$_3$ •Cl- | SP-4 |
| $CH_3-(CH_2)_{17}-N^+(CH_3)(CH_3)-(CH_2)_{17}CH_3$ •Cl- | SP-5 |
| Ethyl-N$^+$(CH$_3$)(CH$_3$)-(CH$_2$)$_{17}$CH$_3$ •O-SO$_2$-O-ethyl | SP-6 |
| Benzyl-N$^+$(CH$_3$)(CH$_3$)-CH$_2$CH$_2$-O-CH$_2$CH$_2$-O-C$_6$H$_4$-C(CH$_3$)$_2$CH$_2$C(CH$_3$)$_3$ •Cl- | SP-7 |
| Benzyl-N$^+$(CH$_3$)(CH$_3$)-(CH$_2$)$_{11}$CH$_3$ •Cl- | SP-8 |
| CAS Registry number 91080-64-7, ie, Quaternary ammonium compounds, (C16-18 and C18-un-satd.alkyl)tris(hydroxyethyl), acetates (salts) | SP-9 |

TABLE 2-continued

| Structure | Nr |
|---|---|
| CAS registry number 78169-20-7, ie. Sulfonium compounds, C11-14-alkylbis(hydroxyethyl), 2-hydroxyethylsulfates (salts) (REACH registrant = BASF) | SP-10 |

Also useful in the invention is the use of surfactants which have a tertiary amine group and which can be made cationic by protonation. These are called hereafter cationic surfactant precursors. In most cases these tertiary amine surfactants are water insoluble and become water soluble after protonation. Protonation can be done using an organic or inorganic acid, such as hydrochloric acid, hydrobromic acid, nitric acid, acetic acid, acrylic acid. One can also add the tertiary amine surfactant via the solvent phase, ie. add to the polymerization mixture in e.g. acetone or acetonitrile before the water is added. The first fraction of water which is added should then be preferably acidified with an organic or inorganic acid to make the salt in-situ after adding the water in the dispersion step. If the pKa of the tertiary amine is low enough the amine might be protonated also without the addition of an acid in the aqueous phase. Suitable cationic surfactant precursors are listed in Table 3.

TABLE 3

| Structure | Nr |
|---|---|
| $CH_3-N(CH_3)-(CH_2)_{13}CH_3$ | AS-1 |
| $CH_3-N(CH_3)-(CH_2)_{15}CH_3$ | AS-2 |
| $CH_3-N(CH_3)-(CH_2)_{11}CH_3$ | AS-3 |
| HO-(CH$_2$CH$_2$O)$_n$-CH$_2$CH$_2$-N((CH$_2$)$_{11}$CH$_3$)-CH$_2$CH$_2$-(OCH$_2$CH$_2$)$_n$-OH | AS-4 |
| HO-CH$_2$CH$_2$-N(CH$_2$CH$_2$OH)-(CH$_2$)$_{11}$CH$_3$ | AS-5 |
| $CH_3-N(CH_3)-(CH_2)_{11}CH_3$ •HBr | AS-6 |
| $CH_3-N(CH_3)-(CH_2)_{11}CH_3$ •HCl | AS-7 |

Other suitable tertiary amine surfactants can e.g. be purchased from Akzo such as tradenames: Armeen DM12D, ie. dodecyldimethyl amine=CAS registry number 112-8-5 Armeen DM16D, ie. hexadecyl dimethyl amine=CAS registry number 112-69-6 Armeen M2C, ie. dicocoalkyl methyl amine=CAS registry number 61788-62-3 Ethomeen C12, ie. ethoxylated (2) cocoalkyl amine=CAS registry number 61791-31-9.

A.1.5. Polyols Containing a Cationic Group

Polyols containing a cationic group or cationic precursor group such as an amine may also be incorporated in the PU-resin of the invention to provide extra cationic groups and hence increase the fixing power for colorants. Suitable polyols for obtaining the aqueous dispersion according to the invention are polyols containing a positively charged atom selected from the group of N, P, S, and I. More preferably the polyol comprises a group selected from the group consisting of an quaternary ammonium, a quaternary phosphonium, a tertiary sulfonium and a iodonium.

Preferably the polyol comprises a quaternized ammonium group. The term 'quaternized' indicates that the positively charged N-atom is linked to 4 substituted or unsubstituted alkyl groups. More preferably the polyol comprising the quaternized ammonium groups is a diol.

Suitable polyols comprising a positively charged atom selected from the group of N, P, S, and I are tabulated in Table 1 of the unpublished patent application EP19188256.2.

A.2. Reaction Conditions

With regard to the conditions for the reaction between the polyether polyol, the polymeric diol and the polyisocyanate compound, conventionally used reaction conditions can be used without particular limitation.

In the reaction between the polymeric diol, the polyether polyol and the polyisocyanate compound, if necessary, a diol with Mw equal to or less than 400 can be used. Examples of suitable diols are: ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanediol; and tri- or higher-valent polyols such as glycerin, trimethylolethane, trimethylolpropane and pentaerythritol. 1,4-butane diol is most preferred.

In the polyurethane synthesis different high molar mass polymeric diols and low molecular weight diols can be reacted, besides the polyether polyol used for stabilization of the polyurethane dispersion. Particularly, if a polyester diol is used in the reaction, the stabilizing polyols and the polyester diol (Mw>400 g/mol) are reacted with in excess of isocyanate. This enables a good conversion of the reaction. Depending on the molecular weight and the copolymer composition, the polyester diol, may have a poor solubility in the reaction solvent (e.g. acetone). After reacting using an excess of isocyanate, the excess is compensated to a NCO/OH molar ratio by addition of a low molecular weight diol, which would lead to a polyurethane resin with very low amount of residual isocyanate. In case some residual isocyanate is present some urea bonds could be formed. Examples of suitable diols are given above.

Examples of the organic solvent used for the reaction between the polyether diol and the organic polyisocyanate compound, here include ketones such as acetone and methyl ethyl ketone, ethers such as tetrahydrofuran and dioxane, acetates such as ethyl acetate and butyl acetate, nitriles such as acetonitrile, and amides such as dimethyl formamide, N-methylpyrrolidone and N-ethylpyrrolidone. These may be used singly or in combinations of two or more.

Using higher molecular weight polyether polyols than Ymer120N will give more phase separation, providing a better water dispersibility. However, for the making of the polyurethane resin, it is more difficult to dissolve these polyols in de organic solvent, e.g. acetone. This can be overcome by using a co-solvent during the polycondensation reaction. A preferred co-solvent is 2-pyrolidon or N-methylpyrrolidone, more preferably 2-pyrolidon.

The aqueous polyurethane dispersion of the invention contains the polyurethane resin having a polyalkylene oxide side chain. Therefore, the obtained polyurethane resin is preferably dispersed in water to obtain an aqueous dispersion of the polyurethane resin. Every dispersing technology suitable for preparing an aqueous dispersion may be used. After being dispersed in an aqueous medium, the organic solvents wherein the reaction took place, can be removed using standard separation techniques such as distillation.

B. Aqueous Treatment Liquid

The aqueous treatment liquid according to the present invention contains the polyurethane resin dispersion as described in § A.1. and water. Additional components may be added to the treatment liquid are given below. The amount of polyurethane resin in the treatment liquid is equal to or lower than 30 wt. % with respect to the total weight of the treatment liquid.

B.1. Water Soluble Organic Solvent

The treatment liquid of the invention may contain, besides water as a solvent, also a water-soluble organic solvent. Examples of water-soluble organic solvents include polyhydric alcohols such as diethylene glycol, triethylene glycol, dipropylene glycol, 1,3-propanediol, 1,3-butanediol, 1,4-butanediol, 2,2-dimethyl-1, 3-propanediol, 2-methyl-1, 3-propanediol, 1,2-pentanediol, 2,4-pentanediol, 1,5-pentanediol, 1,6-hexanediol, 2-ethyl-1,3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2,4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The content of the water-soluble organic solvent, in the treatment liquid is preferably less than 70 wt. %. If the content exceeds 70% by mass, the treatment liquid loses its water based, hence more green character.

B.2. Surfactant

In the treatment liquid of the present invention, a surfactant may be added in order to ensure wettability onto the substrate. The amount of the surfactant added is preferably 0.1 wt. % to 5 wt. % as an active component in the ink.

If the amount added is below 0.1% by mass, wettability onto the substrate is not sufficient and causes degradation in image quality and in adhesion to the substrate. The surfactant that can be used is not particularly limited as long as it satisfies the above limitation.

While any of an amphoteric surfactant, a non-ionic surfactant, or a cationic surfactant can be used, non-ionic surfactants such as polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability and image quality. In addition, a fluorine-based surfactant and a silicon-based surfactant can be used in combination (or singly) depending on formulation.

Suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air products.

B.3. Additives

Together with the polyurethane resin, a flocculant such as a multivalent metal ion can be contained in the treatment liquid. Suitable examples are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating or flocculating the pigments of the ink by acting on anionic groups such as the carboxyl groups on the surface of the pigment or the dispersed polymer of capsules contained in the ink. As a result, the ink remains on the surface of the substrate to improve the colour-developing property. Therefore, it is preferred that the surface of the pigment in the ink and/or the dispersed polymer of the capsules contained in the ink have an anionic group selected from the group of carboxyl group, sulfonate group and phosphonate group, most preferably carboxyl group.

Other suitable inorganic flocculants are: polyaluminium hydroxychloride such as Sylojet A200 from Grace and Drygen from Clariant, zirconium salts, boehmites such as Disperal series, Alumina sols such as Aluminasol series and barium sulfate.

The treatment liquid may also contain organic acids as flocculant. Preferred examples of the organic acids include, but are not limited to acetic acid, propionic acid, and lactic acid.

The treatment liquid may also contain colorants, such as pigments. Particularly useful for printing on dark substrates is a treatment liquid containing a white pigment. The preferred pigment for the aqueous treatment liquid ink is titanium dioxide. Titanium dioxide ($TiO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully setforth.

The titanium dioxide particles can have a wide variety of average particle sizes of about 1 micron or less, depending on the desired end use application of the treatment liquid. For applications demanding high hiding or decorative printing applications, the titanium dioxide particles preferably have an average size of less than about 1 µm. Preferably, the particles have an average size of from about 50 to about 950 nm, more preferably from about 75 to about 750 nm, and still more preferably from about 100 to about 500 nm.

In addition, unique advantages may be realized with multiple particle sizes, such as opaqueness and UV protection. These multiple sizes can be achieved by adding both a pigmentary and a nano grade of $TiO_2$.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photoreactivity of the titanium dioxide. Metal oxide coatings of alumina, aluminasilica, boria and zirconia result in a positive charged surface of the $TiO_2$ pigments and hence are particularly useful in combination with the cationic polyurethane dispersion of the invention because no additional surface treatment of the pigment is required.

Commercial examples of such coated titanium dioxides include R700 (alumina-coated, available from E. I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan). Other suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

C. Aqueous Inkjet Ink

The aqueous polyurethane resin dispersion according to the invention can be incorporated in an aqueous inkjet ink. Preferably, the colorants included in the inkjet ink according to the invention are pigments, more preferably the surface of the pigments is positively charged to avoid aggregation between the polyurethane resin and the pigment.

To obtain a positively charged pigment surface in an aqueous ink formulation, the pigments may be dispersed in an aqueous medium with a dispersing agent having the Formula III Formula III

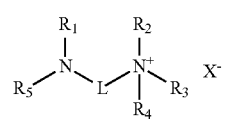

wherein $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group L represents a divalent linking group comprising 2 to 10 carbon atoms $R_2$, $R_3$ and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group $R_5$ represent a hydrocarbon group comprising at least 8 carbon atoms Any of $R_1$, $R_2$, $R_3$, $R_4$ and L may represent the necessary atoms to form a five to eight membered ring X− represents an anion to compensate the positive charge of the ammonium group.

In a preferred embodiment, $R_5$ represents a substituted or unsubstituted alkyl group, comprising at least 8 carbon atoms, more preferably at least 10 carbon atoms and most preferably at least 12 carbon atoms. In a particularly preferred embodiment, $R_5$ represents an unsubstituted alkyl group comprising at least 10 carbon atoms. In another preferred embodiment, R1 is selected from the group consisting of a hydrogen and a substituted or unsubstituted alkyl group, a hydrogen and a C1 to C6 unsubstituted alkyl group being more preferred, a hydrogen being the most preferred. In a further preferred embodiment, L represents a divalent linking group comprising 2 to 8 carbon atoms, 2 to 6 carbon atoms being more preferred. In another preferred embodiment, $R_2$, $R_3$ and $R_4$ independently represent a substituted or unsubstituted alkyl group, a C1 to C6 unsubstituted alkyl group being more preferred, a methyl, an ethyl and a propyl group being the most preferred.

Typical dispersing agents, according to general formula III are given in Table 1 of the patent application: WO2019/105867.

The pigment of the dispersion according to the invention can be any pigment but is preferably a colored pigment. Examples include, but are not limited to, carbon black, and colored pigments such as anthraquinones, phthalocyanine, blues, phthalocyanine greens, diazos, monoazos, pyranthrones, perylenes, heterocyclic yellows, quinacridones, diketo-pyrrolo-pyrrolo pigments and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyrathrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellow include Pigment Yellow 117 and Pigment Yellow 138.

More preferably the pigment is selected from the groups of quinacridones and diketo-pyrolo-pyrrolo pigments. Particularly preferred pigments are selected from the group consisting of Pigment Red 122, Pigment Violet 19 and mixed crystals of the above particular pigments. A commercially available example is Cinquasia Magenta RT-355-D from Ciba Speciality Chemicals. Examples of other suitable colored pigments are described in Colour Index, $3^{rd}$ edition (The Society of Dyers and Cikiyrusts, 1982).

Particularly useful for printing on dark textile is an aqueous inkjet ink containing the dispersion of the invention having a white pigment as pigment. The preferred pigment is titanium dioxide. See § B.3.

In the pigment dispersion, it is desirable that the average particle diameter of the pigment particles be in the range of 0.01 to 1 μm, more preferably in the range of 0.01 to 0.5 μm, most preferably in the range of 0.01 to 0.2 μm. When the average particle diameter of the pigment particles is 0.2 μm or less, the problems concerning the reliability such as clogging of the nozzle and the storage stability of the ink composition can be effectively minimized. When the average particle diameter of the pigment particles is 0.01 μm or more, the advantages of the pigments for use in the present invention, ie., excellent light resistance and water resistance can be effectively exhibited, and aggregation of pigment particles can be prevented.

The pigment to dispersing agent ratio (by wt.) is preferably, from about 0.7 to about 3.2, more preferably, from about 1.0 to about 2.8 and most preferably from about 1.8 to about 2.4.

For dispersing the pigments, a variety of dispersion apparatus, for example, a ball mill, sand mill, roll mill, colloid mill, ultrasonic homogenizer, and high-pressure homogenizer can be employed. Using any of the abovementioned dispersion apparatus, a pigment and water serving as a solvent are mixed and dispersed, with the addition thereto of the dispersing agent as described above thereby obtaining the pigment dispersion of the invention. The whole amount or partial amount of the dispersing agent is preferably added during the dispersing step.

The pigment dispersion may contain up to 75 (wt.) % pigment, but will generally be in the range of approximately 0.1 to 30(wt.) %, preferably 0.1 to 15 (wt.) %, more preferably from 0.1 to 10 (wt.) %. When the amount ratio of the pigment is 0.1 wt. % or more, sufficient saturation and image density can be obtained. When the amount ratio of the pigment is 30 wt. % or less, a decrease in color value can be prevented and the nozzles of a print head can be prevented from being clogged.

Besides a pigment, the inkjet ink according to the invention may also comprise a water-soluble organic solvent and/or a surfactant. Preferred candidates for water-soluble organic solvents are disclosed in § B.1. Preferred candidates for surfactants are disclosed in § B.2.

D. Application Method of the Treatment Liquid

The treatment liquid according to the present invention is suitable for treating different substrates, porous and non-porous ones. The liquid is then also called a pre-treatment liquid. Porous substrates include paper, card board, white lined chipboard, corrugated board, packaging board, wood, ceramics, stone, leather and textile. Non-porous substrates include metal, synthetic leather, glass, polypropylene, polyvinylchloride, PET, PMMA, polycarbonate, polyamide, polystyrene or co-polymers thereof. The treatment liquid according to the present invention is also suitable for treating jetted images, commonly known as post treatment fluid.

All well-known conventional methods can be used for coating or impregnating the treatment liquid on a substrate or on an image formed by jetting an aqueous inkjet ink. Examples of the method include air knife coating, blade coating, roll coating, gravure coating. After applying the treatment liquid onto a substrate, the coating is preferably dried before printing the image onto the treated substrate.

The treatment liquid is particularly suitable for treating non-porous substrates, before or after printing images with inkjet printing.

The treatment liquid is also suitable for treating textile fabrics. The textile fabric used is made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the above-mentioned fibres. The treatment liquid containing the polyurethane resin according to the invention can be preferably applied to the fabric by spraying, coating, padding or pad printing. Alternatively, the treatment liquid may also be applied to the fabric using an ink jet head or valve jet head. This means of applying the treatment liquid has the advantage that the amount of required treatment liquid is substantially lower than with the other application methods. By means of a jetting head, it is possible to apply treatment liquid onto areas of the fabric where the image should be printed. Suitable ink jet head types for applying the treatment liquid are piezoelectric type, continuous type, thermal print head type or valve jet type.

Fabric to which the treatment liquid has been applied may be dried and optionally undergo a heat treatment, before the subsequent ink jetting step with the pigment containing ink. Examples of the heating process include, but are not limited to, heat press, atmospheric steaming, high-pressure steaming, and THERMOFIX. Any heat source can be used for the heating process; for example, an infrared ray lamp is employed.

In another preferred embodiment of the invention, the treatment liquid, after having been applied onto a substrate, is not substantially dried before the image is printed by means of the jetting of the aqueous ink jetting step.

EXAMPLES

1. Measuring Methods 1.1. Average Particle Size

Samples of the PU dispersion were diluted 10 times with a 0.005 M NaCl aqueous solution. A diluted PU dispersion of 1.0 mL was brought in a disposable polystyrene cuvette (DTS0012), and its z-average particle size was measured with Malvern Zetasizer Nano S 3 times at 23° C. after 30 seconds of stabilization time.

1.2. Colloidal Stability at Increased pH

The colloidal stability of the aqueous cationic polyurethane dispersion at increased pH is determined by adding to 3 ml of the dispersion, 1 drop of a 10 wt. % solution of NaOH in a test tube. The formation of precipitation, agglomeration or aggregation is visually evaluated and a figure is attributed to it as tabulated in Table 4.

TABLE 4

| Visual observation of aqueous PU dispersion | Scale |
| --- | --- |
| No difference observed | 0 |
| Clear dispersion with slight precipitates | 1 |
| Slightly blurry dispersion | 2 |
| Severe blurry dispersion | 3 |
| Formation of agglomerates | 4 |
| Severe formation of agglomeration | 5 |

2. Materials

All materials used in the following examples were readily available from standard sources such as Sigma-Aldrich (Belgium) and Acros (Belgium) unless otherwise specified. The water used was demineralised water.

Acetone is acetone p.a. supplied by R International

Dynacoll 7150 is a polyester diol supplied by Evonik

Ymer N120 is 1,3 diol polyether supplied by Perstorp

Reaxis C708 is a catalyst supplied by Reaxis BV, The Netherlands

DBTL is dibutyl tin laurate (KEVER- A T DBTL 162) supplied by Brenntag

IPDI is Desmodur I, a polyisocyanate supplied by Covestro

BD is 1,4-butane diol

Triethylamine is triethylamine

SP-8 is benzyl dimethyl dodecyl ammonium chloride

S-13 dodecyl(benzyl)diethanolammonium chloride=benzoxonium chloride provided by Sachem under the tradename BEXOC AS-5.HCL: dodecyldiethanolammonium chloride is obtained by protonation of Ethomeen C12 as supplied by Akzo, (CAS registry number 61791-31-9), ie. N,N-Bis(2-hydroxyethyl)(coconut oil alkyl)amine: In an Erlenmeyer of 100 mL, 8.79 g of Ethomeen C12 was dissolved in 25.25 mL of 1.2 M HCl(aq.) at ambient temperature under atmosphere pressure. To prepare a solution of N,N-bis(2-hydroxyethyl)(coconut oil alkyl) ammonium chloride which was further used in the preparation of PU dispersion, 34.75 mL of demineralized water was added to the mixture, and the mixture was stirred overnight.

SURF-1 is Capstone FS3100, a surfactant from Dupont

PYR is 2-pyrrolidone

HD is 1,2-hexanediol

COL is CAB-O-JET 450C, a cyan colorant from Cabot

PU-9 dispersion is a reproduction of the PU-9 dispersion disclosed in the published patent application: WO2018/077624 having a solid content of 41.9 wt. %

SURF-2 is Tego Wet 270, a surfactant from Evonik Industries

3. Synthesis of the Aqueous Polyurethane Dispersions According to the Invention

PU-I1

In an Erlenmeyer of 500 mL 111.73 g of Dynacoll 7150 and 174.02 g of acetone were weighed. The solution of Dynacoll 7150 in acetone was stirred at room temperature during 60 minutes by using a magnetic stirrer to obtain a colorless and clear solution. The poly ether diol, Ymer N120, was preheated in an oven at 80° C. to obtain a liquid product, and 16.40 g of Ymer N120 was added to the solution. The resulting polyol mixture was then stirred during 15 minutes by using a magnetic stirrer, in order to obtain the polyol mixture which is used in the reaction. In a 500 mL three-necked round-bottom flask equipped with a coiled condenser and an overhead stirrer the polyol mixture was added under a continuous flow of nitrogen, and the Erlenmeyer was flushed with 19.78 g of acetone. A solution of 1.07 g of Reaxis C708 in 7.84 g of acetone was further added to the reaction mixture. The reaction mixture was warmed up to 55° C. during 30 minutes. Subsequently 19.69 g of IPDI was added dropwise via an addition funnel with pressure equalization arm during 20 minutes. The amount of isocyanate is in excess towards the hydroxyl amount, ie. NCO/OH=1.53. After adding IPDI the addition funnel was flushed with 7.84 g of acetone, and the reaction mixture was stirred at 55° C. during 2 hours. Subsequently a solution of 2.77 g of BD in 3.92 g of acetone was added. The reaction mixture was reacted over 20 hours at 48° C. and then heated at 55° C. during 1 hour in order to reach full conversion.

A mixture of 326.10 g of the formed nonionic prepolymers was weighed in a stainless steel vessel. Subsequently the water based dispersion was made by using Disperlux equipment through adding water during high shear mixing. A solution of 10.35 g of SP-8 in demineralized water 60 mL was added to the prepolymer mixture under stirring at 700 RPM using a 5 cm diameter dissolver during 20 minutes. To have a dispersion with a 35 wt. % solid content, 207.47 g of water was added for further mixing under stirring at 1000 RPM during 20 minutes. After further stirring at 900 RPM during 35 minutes, the emulsion was transferred to a 2 L round bottom flask to give 502.70 g of a viscous dispersion. During the mixing already part of the solvent had evaporated. The residual volatile solvent was removed from the emulsion at 40° C. by rotary vacuum evaporation under reduced pressure. The evaporation was started at a pressure of 400 mbar and the pressure was decreased gradually till 60 mbar to obtain 368.70 g of a viscous dispersion. Estimating the amount of the evaporated water, 42.80 g of demineralized water was added to get a 35 wt % dispersion. The solids content was measured of the resulting dispersion, ie. 36.85 wt %. The pH of the obtained dispersion is 5.53. The average particle size in a Malvern particle sizer measured is 59.88 nm.

PU-I2

In an Erlenmeyer of 500 mL 111.73 g of Dynacoll 7150 and 94.92 g of acetone were weighed. The solution of Dynacoll 7150 in acetone was stirred at room temperature during 60 minutes by using a magnetic stirrer to obtain a colorless and clear solution. The poly ether diol, Ymer N120, was preheated in an oven at 80° C. to obtain a liquid product, and 16.40 g of Ymer N120 was added to the Dynacoll solution. The resulting polyol mixture was then stirred during 15 minutes by using a magnetic stirrer. in order to obtain the polyol mixture which is used in the reaction. In a 500 mL three-necked round-bottom flask equipped with a coiled condenser and an overhead stirrer 10.35 g of SP-08 and 78.60 g of acetonitrile were subsequently added under a continuous flow of nitrogen. The reaction mixture was warmed up to 60° C. and stirred during 30 minutes. While the surfactant dissolved in acetonitrile, the mixture of Dynacoll and Ymer was added to the reaction solution via an addition funnel. The reaction solution was slightly turbid in the beginning and became clear while adding the polyol mixture during 30 minutes. After the addition of polyols, the funnel was flushed with 15.82 g of acetone. A solution of 1.07 g of Reaxis C708 in 7.84 g of acetone was further added to the reaction mixture. Subsequently 19.69 g of IPDI was added dropwise via an addition funnel with pressure equalization arm during 20 minutes. The amount of isocyanate is in excess towards the hydroxyl amount, ie. NCO/OH=1.53. After adding IDPI the addition funnel was flushed with 7.86 g of acetonitrile, and the reaction mixture was stirred at 55° C. during 2 hours. Subsequently a solution of 2.77 g of 1,4-butane diol in 3.92 g of acetone was added. The reaction mixture was reacted over 20 hours at 48° C. and then heated at 55° C. during 1 hour in order to reach full conversion.

A mixture of 348.10 g of the formed non-ionic prepolymers was weighed in a stainless steel. Subsequently the water based dispersion was made by using Disperlux equipment through adding water during high shear mixing. Under stirring at 900 RPM using a 5 cm diameter dissolver stirrer, 276.69 g of water was added to the prepolymer mixture during 20 minutes. Further stirred during 30 minutes under stirring at 800 RPM, the emulsion was transferred to a 2L round bottom flask to give 556.50 g of a viscous dispersion. The residual volatile solvent was removed from the emulsion at 40° C. by rotary vacuum evaporation under reduced pressure. The evaporation was started at a pressure of 400 mbar and the pressure was gradually decreased till 60 mbar to obtain 377.70 g of a viscous dispersion. Estimating the amount of the evaporated water, 48.0 g of demineralized water was added to the viscous dispersion to get a 35 wt. % dispersion. The solids content was measured of the resulting dispersion, ie. 36.60 wt. %. The pH of the obtained dispersion is 5.82. The average particle size is 55.34 nm.

PU-I3

In an Erlenmeyer of 500 mL 110.54 g of Dynacoll 7150 and 174.02 g of acetone were weighed. The solution of Dynacoll 7150 in acetone was stirred at room temperature during 60 minutes by using a magnetic stirrer to obtain a colorless and clear solution. The polyether diol, Ymer N120, was preheated in an oven at 80° C. to obtain a liquid product, and 16.23 g of Ymer N120 was added to the solution. The resulting polyol mixture was then stirred during 15 minutes by using a magnetic stirrer, in order to obtain the polyol mixture which is used in the reaction. In a 500 mL three-necked round-bottom flask equipped with a coiled condenser and an overhead stirrer the polyol mixture was added under a continuous flow of nitrogen, and the Erlenmeyer was flushed with 19.78 g of acetone. A solution of 1.07 g of Reaxis C708 in 7.84 g of acetone was further added to the reaction mixture. The reaction mixture was warmed up to 55° C. during 30 minutes. Subsequently 19.48 g of IPDI was added dropwise via an addition funnel with pressure equalization arm during 20 minutes. The amount of isocyanate is in excess towards the hydroxyl amount, ie. NCO/OH=1.53. After adding IDPI the addition funnel was flushed with 7.84 g of acetone, and the reaction mixture was stirred at 55° C. during 2 hours. Subsequently a solution of 2.74 g of BD in 3.92 g of acetone was added. The reaction mixture was reacted over 20 hours at 48° C. and then heated at 55° C. during 1 hour in order to reach full conversion.

A mixture of 318.20 g of the formed nonionic prepolymers was weighed in a stainless steel. Subsequently the water based dispersion was made by using Disperlux equipment through adding water during high shear mixing. A solution of 11.92 g of S-13 in demineralized water 60 mL was added to the prepolymer mixture under stirring at 800 RPM using a 5 cm diameter dissolver during 20 minutes. To have a dispersion with a 35 wt. % solid content, 202.37 g of water was added for further mixing under stirring at 900 RPM during 20 minutes. After further stirring at 900 RPM during 35 minutes, the emulsion was transferred to a 2 L round bottom flask to give 477.00 g of a viscous dispersion. During the mixing already part of the solvent has evaporated. The residual volatile solvent was removed from the emulsion at 40° C. by rotary vacuum evaporation under reduced pressure. The evaporation was started at a pressure of 400 mbar and the pressure was gradually decreased till 60 mbar to obtain 365.80 g of a viscous dispersion. Estimating the amount of the evaporated water, 37.80 g of demineralized water was added to get a 35 wt. % dispersion. The solids content was measured of the resulting dispersion, ie. 37.69 wt. %. The pH of the obtained dispersion is 5.39. The average particle size is 57.37 nm.

PU-I4

In an Erlenmeyer of 500 mL 112.07 g of Dynacoll 7150 and 174.02 g of acetone were weighed. The solution of Dynacoll 7150 in acetone was stirred at room temperature during 60 minutes by using a magnetic stirrer to obtain a colorless and clear solution. The polyether diol, Ymer N120, was preheated in an oven at 80° C. to obtain a liquid product, and 16.45 g of Ymer N120 was added to the solution. The resulting polyol mixture was then stirred during 15 minutes by using a magnetic stirrer, in order to obtain the polyol mixture which is used in the reaction. In a 500 mL three-necked round-bottom flask equipped with a coiled condenser and an overhead stirrer the polyol mixture was added under a continuous flow of nitrogen, and the Erlenmeyer was flushed with 19.78 g of acetone. A solution of 1.07 g of Reaxis 0708 in 7.84 g of acetone was further added to the reaction mixture. The reaction mixture was warmed up to 55° C. during 30 minutes. Subsequently 19.65 g of IPDI was added dropwise via an addition funnel with pressure equalization arm during 20 minutes. The amount of isocyanate is in excess towards the hydroxyl amount, ie. NCO/OH=1.53. After adding IDPI the addition funnel was flushed with 7.84 g of acetone, and the reaction mixture was stirred at 55° C. during 2 hours. Subsequently a solution of 2.77 g of BD in 3.92 g of acetone was added. The reaction mixture was reacted over 20 hours at 48° C. and then heated at 55° C. during 1 hour in order to reach full conversion.

A mixture of 314.60 g of formed non-ionic prepolymers was weighed in a stainless steel. Subsequently the water based dispersion was made by using Disperlux equipment through adding water during high shear mixing. A solution of 60 mL of AS-5.HCL was added to the prepolymer mixture under stirring at 600 RPM using a 5 cm diameter dissolver during 20 minutes. To have a dispersion with a 35wt. % solid content, 207.92 g of water was added for further mixing under stirring at 900 RPM during 20 minutes. After further stirring during 35 minutes at 1000 RPM, the emulsion was transferred to a 2 L round bottom flask to give 485.50 g of a viscous dispersion. During the mixing already part of the solvent has evaporated. The residual volatile solvent was removed from the emulsion at 40° C. by rotary vacuum evaporation under reduced pressure. The evaporation was started at a pressure of 400 mbar and decreased the pressure gradually till 60 mbar to obtain 349.20 g of a viscous dispersion. Estimating the amount of the evaporated water, 47.60 g of demineralized water was added to get a 35 wt. % dispersion. The solids content was measured of the resulting dispersion, ie. 39.38 wt. %. The pH of the obtained dispersion is 5.59. The average particle size is 52.46 nm.

4. Synthesis of Comparative Aqueous Polyurethane Dispersions

The comparative PU dispersion (PU-C1) corresponds to the dispersion PU-2 mentioned in the patent application WO2019/105786.

The comparative PU dispersion (PU-C2) corresponds to the dispersion PU-4 mentioned in the patent application WO2019/105786.

5. Resistance to pH Increase

The change in colloidal stability at a pH increase to simulate the application of an inkjet ink onto an applied pre-treatment liquid is determined according to method 1.2. The results of the tests are summarized in Table 5.

TABLE 5

| PU-resin dispersion | Invention/ comparative | Cationic surfactant added to organic solvent before/ after reaction | Colloidal stability after pH increase |
| --- | --- | --- | --- |
| PU-I1 | Inv | after | 1 |
| PU-I2 | Inv | before | 1 |
| PU-I3 | Inv | after | 0 |
| PU-I4 | Inv | after | 1 |
| PU-C1 | Comp | N.a. | 4 |

As can be seen from the results of Table 5, the PU-resin dispersions according to the invention show a better colloidal stability at increased pH, thus showing that they preserve better their cationic character which leads to an improved color fixing power if used in a pre-treatment of the substrate before inkjet printing.

Example 2

This example shows that treatment liquids wherein the PU-resin dispersion according to the invention is combined with white pigments show an excellent storage stability.

Preparation of a White Pigment Dispersion (WIT-1)

275 g of white pigment (TRONOX CR 834) was added to a mixture of 68.75 g of Disperbyk 190 and 2.2 g of Proxel K in 204.05 g of water under high shear by means of a Disperlux for 30 minutes. 200 g 0.4 mm yttrium stabilized zirconia beads ("high wear resistant zirconia grinding media" from TOSOH Co.) was added and the white pigment was milled for 75 minutes in a Dynomill Research Lab at a flow of 4500 t/min. The zirconia beads were removed by filtration and the dispersion was filtered over a 0.7 pm filter. The dispersion WIT-1 had an average particle size of 183 nm.

Preparation of the Treatment Liquids PTL-1 and PTL-2

Treatment liquids PTL-1 and PTL-2 were prepared by mixing the compounds given in Table 6. All weight percentages are relative to the total weight of the liquid.

TABLE 6

| Compound | PTL-1 Content in wt. % | PTL-2 Content in wt. % |
|---|---|---|
| PU-C2 | 33.43 | — |
| PU-I4 | — | 30.47 |
| WIT-1 | 22.00 | 22.00 |
| PYR | 15.0 | 15.0 |
| HD | 15.0 | 15.0 |
| SURF-1 | 0.8 | 0.8 |
| Water | To complete to 100% | To complete to 100% |

PTL-2 shows no aggregates nor flocculation when visually inspected by means of an optical transmission microscope after storage in normal conditions (temperature, pressure, light) for 1 month. This shows that the PU-resins according to the invention can be combined with white pigments without causing stability problems in the treatment liquid.

Example 3

This example illustrates the fixing power of the cationic polyurethane binder in the treatment liquid according to the invention towards colorants.

Preparation of the INK-1

A cyan ink INK-1 was prepared by mixing the compounds given in Table 7. All weight percentages are relative to the total weight of the inkjet ink.

TABLE 7

| Compound | INK-1 Content in wt. % |
|---|---|
| PU-9 dispersion | 28.64 |
| PYR | 20.00 |
| HD | 20.00 |
| SURF-2 | 0.60 |
| COL | 20.00 |
| Water | To complete to 100% |

Evaluation and Results

The treatment liquids PTL-1 and PTL-2 were coated with a spiral bar coater (from Elcometer) using an automatic film applicator (Elcometer 4340 from Elcometer) at a speed of 20 mm/s and a wet thickness of 20 µm on a piece of black leather that was cut from a black dyed crusted bovine leather coated with a black pigmented layer from Conceria Nuti Ivo S.P.A. (Italy). After drying the coated layer at 60° C. in an oven for 5 minutes, the treated substrate sheets were coated with INK-1 by means of the same 20 µm spiral bar. The coated samples were dried at 60° C. for 5 minutes.

The reflectance spectrum of each coated sample after drying was measured two times with a X-Rite™ eXact spectrophotometer in the range from 400 up to 700 nm in steps of 10 nm. The CIEL*a*b* coordinates were determined for a 2° observer and a D50 light source.

The formula below relates to a measured color difference to a known set of CIEL*a*b* coordinates. Given two colors in CIEL*a*b* color space, $(L_1, a_1, b_1)$ and $(L_2, a_2, b_2)$, the CIE76 color difference formula is defined as:

$$\Delta E = \sqrt{(L_1-L_2)^2 + (a_1-a_2)^2 + (b_1-b_2)^2}$$

A value for ΔE≥2.3 corresponds to a JND (just noticeable difference), as explained in Sharma, Gaurav (2003). Digital Color Imaging Handbook (1.7.2 ed.). CRC Press. ISBN 0-8493-0900-X.

In table 8, the L*a*b* values are summarized. The lower the a* value and the lower the b* value, the more cyan the colour.

TABLE 8

| Sample no | Treatment liquid | Inkjet ink | L* | a* | b* |
|---|---|---|---|---|---|
| 1 (COMP) | PTL-1 | INK-1 | 24.13 | −3.96 | −29.36 |
| 2 (INV) | PTL-2 | INK-1 | 24.45 | −5.19 | −32.33 |

From Table 8 it can be seen that the color print with the use of a pre-treatment liquid according to the invention (PTL-2+INK-1) gives more cyan color value than with the use of a pre-treatment liquid not containing the polyurethane dispersion according to the invention. In addition, one can calculate the delta E 76 between the two samples and observe that it is equal to 3.24, which represents a significant visual color difference.

The invention claimed is:

1. An aqueous polyurethane resin dispersion, the polyurethane resin having a polyalkylene oxide in a side chain thereof and is obtained by reacting in an organic solvent, a polyisocyanate with a polyether diol according to Formula 1:

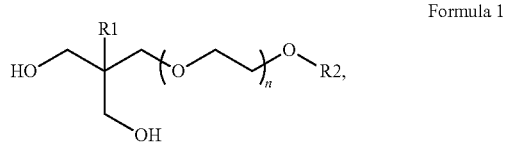

Formula 1 wherein R1 is methyl or ethyl, R2 is H or $C_1$-$C_4$ alkyl, and n represents an integer from 5 to 50, and with a polymeric diol selected from the group consisting of polyester diol, polycarbonate diol, polyacrylate diol, and polyolefin diol, and by adding a cationic surfactant or cationic surfactant precursor to the organic solvent, wherein the cationic surfactant comprises reactive groups capable of reacting with polyisocyanate.

2. The aqueous polyurethane resin dispersion of claim 1, wherein the cationic surfactant comprises a quaternized ammonium group or a tertiary amine group.

3. The aqueous polyurethane resin dispersion of claim 1, wherein the cationic surfactant is added after the reacting is completed.

4. An aqueous treatment liquid for inkjet printing comprising a flocculant and a polyurethane resin dispersion in an amount of from 1 wt. % to 30 wt. % with respect to the total weight of the treatment liquid, the polyurethane resin having a polyalkylene oxide in a side chain thereof and is obtained by reacting in an organic solvent, a polyisocyanate with a polyether diol according to Formula 1:

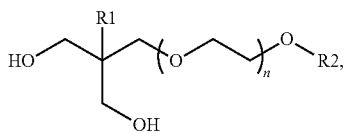

Formula 1 wherein R1 is methyl or ethyl, R2 is H or $C_1$-$C_4$ alkyl, and n represents an integer from 5 to 50, and
with a polymeric diol selected from the group consisting of polyester diol, polycarbonate diol, polyacrylate diol, and polyolefin diol, and
by adding a cationic surfactant or cationic surfactant precursor to the organic solvent.

5. The aqueous treatment liquid for inkjet printing of claim 4, further comprising a pigment.

6. The aqueous treatment liquid for inkjet printing of claim 5, wherein the pigment comprises titanium dioxide.

7. The aqueous treatment liquid for inkjet printing of claim 4, wherein the flocculant is a multivalent metal salt.

8. The aqueous treatment liquid for inkjet printing of claim 4, wherein the cationic surfactant comprises a quaternized ammonium group or a tertiary amine group.

9. The aqueous treatment liquid for inkjet printing of claim 4, wherein the cationic surfactant is according to Formula II
wherein

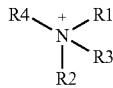

Formula II

R1 is a hydrogen or a substituted or unsubstituted alkyl group having 1 to 4 carbon atoms;
R2 and R3 are each independently a substituted or unsubstituted alkyl group having between 1 carbon atom and 18 carbon atoms or a benzyl group; and
R4 is a substituted or unsubstituted alkyl group having at least 8 carbon atoms.

10. The aqueous treatment liquid for inkjet printing of claim 9, wherein the flocculant is a multivalent metal salt.

11. The aqueous treatment liquid for inkjet printing of claim 4, wherein the cationic surfactant is added after the reacting is completed.

12. The aqueous treatment liquid for inkjet printing of claim 4, wherein the cationic surfactant comprises reactive groups capable of reacting with polyisocyanate.

13. An aqueous inkjet ink comprising a pigment dispersion and a polyurethane resin dispersion in an amount of from 1 wt. % to 30 wt. % with respect to the total weight of the ink, the polyurethane resin having a polyalkylene oxide in a side chain thereof and is obtained by reacting in an organic solvent, a polyisocyanate with a polyether diol according to Formula 1:

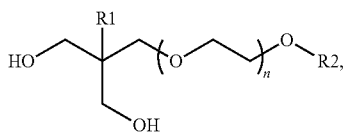

Formula 1 wherein R1 is methyl or ethyl, R2 is H or $C_1$-$C_4$ alkyl, and n represents an integer from 5 to 50, and
with a polymeric diol selected from the group consisting of polyester diol, polycarbonate diol, polyacrylate diol, and polyolefin diol, and
by adding a cationic surfactant or cationic surfactant precursor to the organic solvent, and
the pigment dispersion comprising at least one dispersing agent having the Formula III
wherein

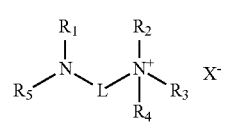

Formula III $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted (hetero) aryl group;
L represents a divalent linking group comprising 2 to 10 carbon atoms;
$R_2$, $R_3$, and $R_4$ are each independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted (hetero) aryl group;
$R_5$ represent a hydrocarbon group comprising at least 8 carbon atoms; and
$X^-$ represents an anion to compensate the positive charge of the ammonium group.

14. A method of preparing the aqueous polyurethane resin dispersion of claim 1, the method comprising:
(i) reacting a polyisocyanate with a polyether diol according to Formula 1:

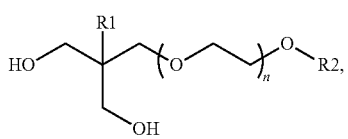

Formula 1 wherein R1 is methyl or ethyl, R2 is H or $C_1$-$C_4$ alkyl, and n represents an integer from 5 to 50, and a polymeric diol selected from the group consisting of polyester diol, polycarbonate diol, polyacrylate diol, and polyolefin diol in an organic solvent in the presence of a cationic surfactant to form a solution of a polyurethane resin, wherein the cationic surfactant comprises reactive groups capable of reacting with polyisocyanate;
(ii) adding water to the solution to form a polyurethane resin dispersion; and
(iii) removing the organic solvent from the dispersion.

15. The method of claim 14, wherein the cationic surfactant comprises a quaternized ammonium group or a tertiary amine group.

16. An inkjet recording method, the method comprising:
(i) providing a substrate;
(ii) forming a pre-treated substrate by applying the aqueous treatment liquid of claim 4 on a surface of the substrate, optionally drying the substrate; and
(iii) printing an image by jetting an ink jet ink on the pre-treated substrate.

\* \* \* \* \*